United States Patent
Branham et al.

(10) Patent No.: US 6,699,537 B2
(45) Date of Patent: Mar. 2, 2004

(54) WATERFAST INK RECEPTIVE COATINGS FOR INK JET PRINTING, METHODS OF COATING SUBSTRATES UTILIZING SAID COATINGS, AND MATERIALS COATED WITH SAID COATINGS

(75) Inventors: Kelly Dean Branham, Winneconne, WI (US); Hue Scott Snowden, Atlanta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 82 days.

(21) Appl. No.: 09/766,262

(22) Filed: Jan. 19, 2001

(65) Prior Publication Data

US 2002/0004121 A1 Jan. 10, 2002

Related U.S. Application Data

(60) Provisional application No. 60/177,074, filed on Jan. 19, 2000.

(51) Int. Cl.[7] .................................................. B41M 5/00
(52) U.S. Cl. ............................... 428/32.29; 428/32.34; 428/32.36
(58) Field of Search .................................. 428/195, 206, 428/325, 331, 32.29, 32.34, 32.36

(56) References Cited

U.S. PATENT DOCUMENTS

| | | | |
|---|---|---|---|
| 3,338,992 A | 8/1967 | Kinney ......................... 264/24 |
| 3,341,394 A | 9/1967 | Kinney ......................... 161/72 |
| 3,542,615 A | 11/1970 | Cary et al. .................. 156/181 |
| 3,692,618 A | 9/1972 | Dorschner et al. ............ 161/72 |
| 3,802,817 A | 4/1974 | Matsuki et al. ............... 425/66 |
| 3,849,241 A | 11/1974 | Butin et al. ................. 161/169 |
| 4,304,610 A | 12/1981 | Weisensel ..................... 134/21 |
| 4,340,563 A | 7/1982 | Appel et al. ................. 264/518 |
| 4,732,786 A | 3/1988 | Patterson et al. ............ 427/261 |
| 5,073,448 A | 12/1991 | Vieira et al. ................. 428/331 |
| 5,075,153 A | 12/1991 | Malhotra .................... 428/207 |
| 5,100,471 A | 3/1992 | Winnik et al. ................ 106/23 |
| 5,165,973 A | 11/1992 | Kojima et al. ............... 428/331 |
| 5,268,030 A | 12/1993 | Floyd et al. ................. 106/450 |
| 5,270,103 A * | 12/1993 | Oliver et al. ............... 428/219 |
| 5,273,575 A | 12/1993 | Romain ..................... 106/23 B |
| 5,279,885 A | 1/1994 | Ohmori et al. ............. 428/195 |
| 5,378,574 A | 1/1995 | Winnik et al. ............... 430/115 |
| 5,439,739 A | 8/1995 | Furukawa et al. .......... 428/341 |
| 5,496,634 A | 3/1996 | Ogawa et al. ............... 428/341 |
| 5,501,731 A | 3/1996 | Schmid et al. .............. 106/417 |
| 5,679,143 A | 10/1997 | Looman ................... 106/20 R |
| 5,695,820 A | 12/1997 | Davis et al. ................. 427/261 |
| 5,698,183 A | 12/1997 | Langer et al. ................ 424/59 |
| 5,751,325 A | 5/1998 | Leenders et al. ............. 347/96 |
| 5,755,870 A | 5/1998 | Ravishankar ............... 106/438 |
| 5,759,673 A | 6/1998 | Ikezawa et al. ............. 428/195 |
| 5,781,216 A | 7/1998 | Haruta et al. ................ 347/106 |
| 5,785,743 A | 7/1998 | Adamic et al. .......... 106/31.27 |
| 5,792,249 A | 8/1998 | Shirota et al. ........... 106/31.27 |
| 5,837,041 A | 11/1998 | Bean et al. ................. 106/31.6 |
| 5,853,861 A | 12/1998 | Held .......................... 428/207 |
| 5,854,307 A | 12/1998 | Kimura et al. .............. 523/161 |
| 5,869,442 A | 2/1999 | Srinivas et al. ............. 510/476 |
| 5,897,694 A | 4/1999 | Woolf ..................... 106/31.27 |
| 5,908,723 A * | 6/1999 | Malhotra et al. ............. 430/31 |
| 5,919,559 A * | 7/1999 | Nakano et al. .............. 428/331 |
| 5,925,176 A | 7/1999 | Rehman ................... 106/31.43 |
| 5,935,310 A | 8/1999 | Engel et al. ............. 106/31.32 |
| RE36,303 E | 9/1999 | Ogawa et al. ............... 428/341 |
| 5,973,036 A | 10/1999 | Matzinger et al. ............ 524/31 |
| 6,001,137 A | 12/1999 | Alfekri et al. ................. 8/445 |
| 6,001,904 A | 12/1999 | Matzinger et al. ............ 524/31 |

(List continued on next page.)

FOREIGN PATENT DOCUMENTS

| | | |
|---|---|---|
| DE | 19643281 A1 | 10/1996 |
| EP | 0458599 A2 | 5/1991 |
| EP | 0534660 A1 | 3/1993 |
| EP | 0605730 A1 | 7/1994 |
| EP | 0627324 A1 | 12/1994 |
| EP | 0709223 A | 1/1996 |
| EP | 0709520 A1 | 5/1996 |
| EP | 0842786 A1 | 11/1997 |
| GB | 412391 | 6/1934 |
| JP | 61277481 A | 8/1986 |
| JP | 01281982 A | 11/1989 |
| WO | 98/43821 | 10/1998 |
| WO | 99/00541 | 1/1999 |
| WO | 99/54541 | 10/1999 |
| WO | 00/56972 | 9/2000 |
| WO | 01/32974 A2 | 5/2001 |

OTHER PUBLICATIONS

International Search Report dated Jul. 11, 2001.
*Technical Manual of the American Association of Textile Chemists and Colorists*, 1999, p. 18–20, 369–375.

(List continued on next page.)

*Primary Examiner*—Cynthia H. Kelly
*Assistant Examiner*—B. Shewareged
(74) *Attorney, Agent, or Firm*—Nelson, Mullins, Riley & Scarborough

(57) ABSTRACT

Media coatings for use on substrates for ink jet printing include a cationically modified clay, a cationically modified silica and a binder. Alternatively, the media coatings also include additional additives. The ratio of cationically modified clay to cationically modified silica varies in the coating formulation from about 1% to about 99%. Desirably, the ratio of the cationically modified clay to cationically modified silica varies from about 10% to about 50%. More desirably, the ratio of cationically modified clay to cationically modified silica varies from about 25% to about 35%. The ratio of the total cationically modified clay and cationically modified silica to binder varies from about 20% to about 80%. Desirably, the ratio of the total cationically modified clay and cationically modified silica to binder varies from about 65% to about 75%.

16 Claims, No Drawings

U.S. PATENT DOCUMENTS

| | | | | |
|---|---|---|---|---|
| 6,007,610 | A | 12/1999 | Matzinger et al. | 106/14.05 |
| 6,020,405 | A | 2/2000 | Matzinger et al. | 524/31 |
| 6,022,547 | A | 2/2000 | Herb et al. | 424/401 |
| 6,022,908 | A | 2/2000 | Ma et al. | 523/160 |
| 6,025,322 | A | 2/2000 | Boeckh et al. | 510/516 |
| 6,086,903 | A | 7/2000 | Trinh et al. | 424/401 |
| 6,150,289 | A * | 11/2000 | Chen et al. | 501/148 |
| 6,203,899 | B1 * | 3/2001 | Hirose et al. | 428/341 |
| 6,383,611 | B1 * | 5/2002 | Kohno et al. | 428/195 |
| 6,387,473 | B1 * | 5/2002 | Sismondi et al. | 428/195 |
| 6,410,123 | B1 * | 6/2002 | Otani et al. | 428/212 |
| 6,420,039 | B1 * | 7/2002 | Field et al. | 428/451 |
| 6,460,957 | B1 * | 10/2002 | Quintens et al. | 347/2 |

OTHER PUBLICATIONS

Sabit Adanur, PH.D., *Wellington Sears Handbook of Industrial Textiles*, 1995, p. 179.

NRL Report No. 4364, "Manufacture of Superfine Organic Fibers," V.A. Wente, E.L. Boone and C.D. Fluharty, Oct. 25, 1954.

NRL Report No. 5265, "An Improved Device for the Formation of Superfine, Thermoplastic Fibers," K.D. Lawrence, R.T. Lucas and J.A. Young, Feb. 11, 1959.

JP 10016381A, Jan. 20, 1998 (Abstract only).
JP 10035090A, Feb. 10, 1998 (Abstract only).
JP 1009279A, Jan. 12, 1989 (Abstract only).
JP 1009776A, Jan. 13, 1989 (Abstract only).
JP 10114144A, May 6, 1998 (Abstract only).
JP 1011876A, Jan. 17, 1989 (Abstract only).
JP 10119425A, May 12, 1998 (Abstract only).
JP 10138632A, May 26, 1998 (Abstract only).
JP 10140059A, May 26, 1998 (Abstract only).
JP 10157278A, Jun. 16, 1998 (Abstract only).
JP 1020188A, Jan. 24, 1989 (Abstract only).
JP 10264506A, Oct. 6, 1998 (Abstract only).
JP 1075281A, Mar. 20, 1989 (Abstract only).
JP 11216948A, Aug. 10, 1999 (Abstract only).
JP 5179577A, Jul. 20, 1993 (Abstract only).
JP 56157470A, Dec. 4, 1981 (Abstract only).
JP 61074889A, Apr. 17, 1986 (Abstract only).
JP 6234268A, Aug. 23, 1994 (Abstract only).
JP 63183873A, Jul. 29, 1988 (Abstract only).
JP 6340163A, Dec. 13, 1994 (Abstract only).
JP 6340164A, Dec. 13, 1994 (Abstract only).
JP 7173420A, Jul. 11, 1995 (Abstract only).
JP 8025794A, Jan. 30, 1996 (Abstract only).
JP 8127979A, May 21, 1996 (Abstract only).
JP 9059550A, Mar. 4, 1997 (Abstract only).
JP 9188978A, Jul. 22, 1997 (Abstract only).
JP 9202038A, Aug. 5, 1997 (Abstract only).
JP 9208853A, Aug. 12, 1997 (Abstract only).
JP 9216917A, Aug. 19, 1997 (Abstract only).

U.S. patent application, SN 09/526,831, Filed Mar. 16, 2000 (Attorney Docket No. 14,689).

U.S. patent application, SN 09/702,093, Filed Oct. 30, 2000 (Attorney Docket No. 15,260).

U.S. Patent Application, SN 10/010,466, Filed Oct. 26, 2001 (Attorney Docket No. 16,373).

\* cited by examiner

WATERFAST INK RECEPTIVE COATINGS FOR INK JET PRINTING, METHODS OF COATING SUBSTRATES UTILIZING SAID COATINGS, AND MATERIALS COATED WITH SAID COATINGS

CROSS REFERENCE TO RELATED APPLICATIONS

This application is related to and claims priority from U.S. Provisional Patent Application Ser. No. 60/177,074, filed Jan. 19, 2000.

FIELD OF THE INVENTION

The present invention relates to coating formulations for paper, film and other substrates which are receptive to common, aqueous ink jet inks and form images exhibiting superior quality when compared to uncoated paper, film and other printable substrates. More specifically, the present invention relates to cationically modified coatings which render the printed images waterfast. The present invention also relates to methods of coating various printable substrates utilizing said coatings as well as materials coated with said coatings.

BACKGROUND OF THE INVENTION

The ink jet method of printing is a rapidly growing, commercially important printing process because of its ability to produce economical, high quality, multi-colored prints. In fact, ink jet print methodology is becoming the print method of choice for producing colored hard copy of computer generated images consisting of graphics and fonts in both narrow and wide format. Ink jet printing is a non-impact and non-contact printing method in which an electronic signal controls and directs droplets or a stream of ink that can be deposited on a wide variety of substrates. Current ink jet printing technology involves forcing the ink drops through small nozzles by piezoelectric pressure, thermal ejection, or oscillation, and onto the surface of a material/media. Ink jet printing is extremely versatile in terms of the variety of substrate material that can be treated, as well as the print quality and the speed of operation that can be achieved. In addition, ink jet printing is digitally controllable.

For these reasons, ink jet printing methodology has been widely adopted for industrial marking and labeling. In addition, ink jet printing methodology has also found widespread use in architectural and engineering design applications, medical imaging, office printing (of both text and graphics), geographical imaging systems (e.g., for seismic data analysis and mapping), signage, in display graphics (e.g., photographic reproduction, business and courtroom graphics, graphic arts), and the like. Finally, ink jet printing has now also been used to create an image on a variety of textile substrates.

Both dyes and pigments have been used as colorants for such ink jet ink formulations. However, such materials do not always adhere well to the substrates to which the ink is applied. For example, dyes may dissolve upon a printed substrate's contact with water. Thus, images applied employing ink jet printing methodology may tend to run or smear upon repeated contact, or may be actually removed from the printed surface if exposed to substantial quantities of aqueous media (e.g., if an ink jet printed article is exposed to water or comes in contact with water through other means). There is therefore a need in the art for coatings which enhance the waterfastness capabilities of various substrates, in particular when aqueous based inks are to be employed on said substrates. It is to such need that the present invention is directed as the coatings of the present invention have proven particularly effective in improving waterfastness.

SUMMARY OF THE INVENTION

In accordance with the present invention, media coatings for use on substrates for ink jet printing include a cationically modified clay, a cationically modified silica and a binder. Alternatively, the media coatings also include additional additives. In particular, in one embodiment of the invention, the media coatings also include a surfactant. The ratio of cationically modified clay to cationically modified silica varies in the coating formulation from about 1% to about 99%. Desirably, the ratio of the cationically modified clay to cationically modified silica varies from about 10% to about 50%. More desirably, the ratio of cationically modified clay to cationically modified silica varies from about 25% to about 35%. The ratio of the total cationically modified clay and cationically modified silica to binder varies from about 20% to about 80%. Desirably, the ratio of the total cationically modified clay and cationically modified silica to binder varies from about 65% to about 75%.

These and other features and advantages of the present invention will become apparent after a review of the following detailed description of the disclosed embodiments and the appended claims.

DETAILED DESCRIPTION OF THE INVENTION

In accordance with the present invention, there are waterfast ink receptive coatings for ink jet printing including a cationically modified clay and a cationically modified silica. These formulations use a blend of cationic clay and cationic silica in combination with binder(s), and optionally surfactants and other additives, to deliver superior image quality and waterfastness.

The coating formulations may be used with paper, film, scrim and other printable substrates which are receptive to common, aqueous ink jet inks and form images exhibiting superior quality to uncoated paper, film or other substrates or to substrates which have merely been coated with either cationically modified clay, or cationically modified silica. Preferred substrates for use with the coating include films known as synthetic papers such as those available from the Oji Yuka Synthetic Paper Corporation and marketed by Kimberly-Clark under the designation Kimdura®. Such substrates are preferred for purposes of waterfastness, since they do not appear to swell or cockle. In particular, Kimdura® synthetic paper having a thickness of 150 microns may be easily used. Other Kimdura® materials such as those having thicknesses of between approximately 60 and approximately 500 microns also may be readily used. It is important that such substrates be able to easily feed through an ink jet printer.

Other films which may be coated with the coating of the present invention include polyester and vinyl films. Other substrates which may be coated with the coating of the present invention include latex saturated paper substrates. Further, such coatings may also be applied to nonwoven substrates, such as those made from polyolefins as well as woven substrates.

Printed images on the ink jet media coating are rendered waterfast, resisting deterioration of the image upon repeated exposure to water. This quality may be developed within hours or minutes from the completion of printing. Exposure to water may be accomplished by placing the printed sample under dripping or running water, or even submersion in water for a limited period of time.

As previously stated, the coating formulation in the present invention utilizes a combination of both a cationically modified clay and a cationically modified silica. An example of such a cationically modified clay may be obtained from ECC International of Atlanta, Ga. under the designation Astra-Jet™. The cationically modified clay consists of an aqueous dispersion of Kaolin and a polyquartenary amine. While, ECCI markets a line of Astra-Jet™ clays, the original clay composition is desirable for the purpose of the coating of the present invention.

The cationically modified silica may consist of an aqueous silica dispersion including a cationic polymer similar to that described above. Alternatively, the cationic silica may consist of an aqueous amorphous silica stabilized with alumina and other additives, such as the cationic silica gel dispersion sold by Grace Davison of Columbia, Md. under the designation Cationic Sylojet P612, with a cationic surface modifier. An unmodified silica is available from Grace Davison under the designation Sylojet P612.

The ratio of cationically modified clay to cationically modified silica may vary in the coating formulation from about 1% up to about 99% by weight. Desirably, the ratio of the cationically modified clay to cationically modified silica may vary from about 10% to about 50% by weight. More desirably, the ratio of cationically modified clay to cationically modified silica may vary from about 25% up to 35% by weight.

The formulation further includes a binder. Such a binder serves to both bind the clay and silica together (pigment particles), and also to bind the coating to a media substrate. The binder may be comprised of any film forming, water insoluble polymer, providing the polymer is compatible with the cationic clay and silica. Binders which are suitable for the formulation include, but are not limited to nonionic latexes composed of polymers of vinyl acetate, ethylene vinyl acetate, acrylates, and acrylate-vinyl acetate. Other polymer materials which are suitable as binders include styrenics such as styrene rubbers (SBR), styrene maleic anhydride (SMA), and styrene acrylonitrile (SAN). Cationic latexes may also be employed as a suitable binder. Further, mildly anionic latexes may also be used as a binder. Strongly anionic latexes would be unacceptable binders however, as they would coagulate with the other cationic materials. The ratio of the total pigment, that is the combination of cationically modified clay and cationically modified silica, to the coating binder may vary from about 20% up to about 80%. Desirably, the ratio of the total pigment to the coating binder may vary from about 65% to about 75%.

In addition to the clay, silica and binder, optional additives may be added to improve the performance of the coatings. For instance, UV absorbers/light stabilizers may be added to improve light fastness. Additionally, surfactants or wetting agents may be added as well. Desirably, if such surfactants are utilized they are nonionic, cationic or zwitterionic. Examples include Triton X100 and Tergitol both from Union Carbide. Further, a leveling agent such as an aliphatic diol may be used as well. Other optional additives include flow modifiers, and optical whiteners and/or brighteners.

The present invention is further described by the examples which follow. Such examples, however, are not to be construed as limiting in any way either the spirit or the scope of the present invention. Unless stated otherwise, all percents are percents by weight. An example of a coating formulation of the present invention, for use on a variety of media substrates is expressed in Table 1. An example of a control coating formulation, without a cationically modified silica, is described in Table 2. The particle size of the following Sylojet P612 silica materials is approximately 12 microns. The clay and silica are present in aqueous dispersions.

TABLE 1

Example of Cationically Modified Clay and Cationically Modified Silica Coating of the Present Invention
(Sample identified as Coating "A" for testing)

| Ingred. | % solids | Parts Dry | Parts Wet | Wt % dry | Wt % wet | Wet Batch × 1.5 |
|---|---|---|---|---|---|---|
| Water |  | 0.0 | 0.0 | 0.0 | 0.0 | 0.0 |
| Cationic Sylojet P612 Silica[a] | 29.4 | 53.0 | 180.3 | 52.4 | 18.2 | 270.4 |
| Astrajet Clay | 35.2 | 22.5 | 63.9 | 22.3 | 7.7 | 95.9 |
| Q2 5211 | 100.0 | 0.6 | 0.6 | 0.6 | 0.21 | 0.9 |
| Airflex 540 | 54.8 | 25.0 | 45.6 | 24.7 | 8.6 | 68.4 |
| Total |  | 101.1 | 290.4 |  |  | 435.6 |

Notes:
[a]Cationic Sylojet P612 Silica is cationically modified silica.

For the purposes of the coating described above, the Q2 5211 is an ethoxylated polysiloxane surfactant and was obtained from Dow Corning. The Airflex 540 is an ethylene vinyl acetate (EVA) latex binder available from Air Products. The pigment to binder ratio (P/B) for the sample was 0.75:1, and the percent total solids (%TS) was 34.8%, by weight.

TABLE 2

Example of Cationically Modified Clay and Unmodified Silica Coating of the Present Invention
(Sample identified as Coating "C" for testing)

| Ingred. | % solids | Parts Dry | Parts Wet | Wt % dry | Wt % wet | Wet Batch × 1.5 |
|---|---|---|---|---|---|---|
| Water |  | 0.0 | 0.0 | 0.0 | 0.0 | 0.0 |
| Sylojet P612 Silica[a] | 26.7 | 53.0 | 198.5 | 52.4 | 17.2 | 297.8 |
| Astrajet Clay | 35.2 | 22.5 | 63.9 | 22.3 | 7.3 | 95.9 |
| Q2 5211 | 100.0 | 0.6 | 0.6 | 0.6 | 0.19 | 0.9 |
| Airflex 540 | 54.8 | 25.0 | 45.6 | 24.7 | 8.1 | 68.4 |
| Total |  | 101.1 | 308.6 |  |  | 463.0 |

Notes:
[a]Sylojet P612 Silica is non-cationically modified silica.

The pigment to binder ratio (P/B) for the sample was 0.75:1, and the percent total solids (%TS) was 32.8%, by weight.

Drawdown

Generally, for each of the coatings of the examples, the components were combined in the order shown using a plastic beaker and a paddle-type mixer. Draw downs using the Meyer Rod method (as is known to those of ordinary skill in the art) were made with a #28–30 meyer rod on Kimdura® FPG 150 (for 150 micron) available from Kimberly-Clark, to yield a coat weight of between approximately 5.5 to 6.0 lbs/1300 sq. ft. (20 gsm to 23 gsm). The coated sample sheets of 10 by 12 inch size were then cut to 8.5 by 11 inch size to facilitate printing and testing.

The specific drawdown procedure employed is described as follows. A 10×12 inch sheet of paper or film (e.g. Kimdura® FPG 150) was placed on a flat surface. A wire-wound (Meyer) rod was placed on top of the sheet and 2 kg weights were placed on the ends of the rod to prevent slipping. The coating was poured on the substrate such that it contacted the rod and formed a narrow pool the width of the substrate. The substrate was drawn under the rod and the coating was spread evenly along the length of the sheet. It should be recognized that different coat weights may be obtained by utilizing rods wound with different size wires.

Alternatively coatings may be applied to substrates via other coating methods known to one of ordinary skill in the art, such as the Air Knife method or the Slot Dye method. Other coating methods include the gravure roll, and reverse roll coating methods. Coatings may be applied at levels from about 5 to about 45 grams per square meter (gsm). Desirably, the coatings are applied at between about 15 to about 35 gsm. The samples were then placed in a conventional forced air oven at approximately 750° C. for about 3–5 minutes to allow to dry. The samples were stored in ambient room conditions (20–25° C.) overnight prior to printing.

The dried samples were then printed with the indicated printers and settings as shown in Tables 3–5 which follow.

Printing

Color blocks of the colors Cyan (C), Magenta (M), Yellow (Y), Black (K), Red (R), Green (G), and Blue (B) were printed from Microsoft® MS Paint block pattern in a 2×5 inch pattern on the Kimdura® sheets. The color blocks were printed with the inks provided with each printer. A white (unprinted) block was also included in the 2×5 inch pattern. The printers used included a Hewlett-Packard 722C on HP Premium Ink Jet Paper/Best Settings, an Epson 850 on Photo Quality Ink Jet Paper/720 dpi/Automatic Settings and a Canon 4200 printer on Hi Resolution Paper/Standard/No Color Matching Settings. Following printing, samples were dried overnight under ambient conditions before further testing. Following printing and drying, the samples were cut out into their respective 2×5 inch block patterns.

Soak Testing

The cut out 2×5 inch samples were placed in a 2 liter plastic beaker containing 2 liters deionized water at 20° C. for 24 hours. Samples were clamped to the side of the container such that the entire test pattern remained submerged for the duration of the test. After this period had elapsed, samples were removed and placed flat on a Kim-Wipes® wiper. KimWipes are wipers available from the Kimberly-Clark Corporation. The surfaces of the samples were gently dried with a KimWipe® wiper. The samples were allowed to dry completely before spectral measurements were taken (minimally 2–3 hours). An X-Rite® Model 938 Spectrodensitometer was used to perform L*a*b* spectral measurements, the CIE LAB measurement being one known to one of ordinary skill in the art. The X-Rite spectrodensitometer was obtained from the X-Rite corporation of Grandville, Mich. In performing the measurements, the illuminant type was a $D_{50}$ and the observer being 2°.

The degree of optical lightening resulting from exposure to water was measured quantitatively using L*a*b* values. Delta E* is calculated in accordance with the following equation:

$$\Delta E^* = SQRT[(L^*standard - L^*sample)^2 + (a^*standard - a^*sample)^2 + (b^*standard - b^*sample)^2],$$

where the standard is representative of the value for the sample that has not been soaked.

The higher the Delta E* (hereinafter ΔE*), the greater the change in color intensity. A large increase in delta E* would typically be indicative of fading, washout or bleed of dye. In running the L*a*b* test on the samples, controls of each coating were used as a basis for comparison. The control samples (STD) were just printed with the respective formulations, as opposed to being printed and soaked. More extensive bleeding of the dyes was observed when the unmodified silica was utilized in the tested samples, i.e. Formulation "C".

TABLE 3

Print Results for Hewlett Packard 722 Printer

| Sample # | Coating | Printer | Print Mode | Color | ΔE* 24 hr soak | Avg. ΔE* |
|---|---|---|---|---|---|---|
| 1 | A | HP 722 | HP Prem. IJ Paper/Best | K | 0.19 | |
| | | | | W | 2.81 | |
| | | | | B | 4.37 | |
| | | | | C | 8.36 | |
| | | | | G | 16.11 | |
| | | | | Y | 14.31 | |
| | | | | R | 2.9 | |
| | | | | M | 0.74 | 6.22 |
| 2 | C | HP 722 | HP Prem. IJ Paper/Best | K | 0.23 | |
| | | | | W | 7.40 | |
| | | | | B | 22.82 | |
| | | | | C | 11.72 | |
| | | | | G | 12.78 | |
| | | | | Y | 24.71 | |
| | | | | R | 6.49 | |
| | | | | M | 6.58 | 11.59 |

TABLE 4

Print Results for Canon 4200 Printer

| Sample # | Coating | Printer | Print Mode | Color | ΔE* 24 hr soak | Avg. ΔE* |
|---|---|---|---|---|---|---|
| 3 | A | Canon 4200 | Hi. Res. Paper/ Standard | K | 2.94 | |
| | | | | W | 0.43 | |
| | | | | B | 2.41 | |
| | | | | C | 1.33 | |
| | | | | G | 5.37 | |
| | | | | Y | 3.25 | |
| | | | | R | 2.36 | |
| | | | | M | 3.09 | 2.65 |
| 4 | C | Canon 4200 | Hi. Res. Paper/ Standard | K | 1.18 | |
| | | | | W | 0.39 | |
| | | | | B | 3.82 | |
| | | | | C | 2.63 | |
| | | | | G | 3.39 | |
| | | | | Y | 5.58 | |
| | | | | R | 2.27 | |
| | | | | M | 7.3 | 3.32 |

TABLE 5

Print Results for Epson 850 Printer

| Sample # | Coating | Printer | Print Mode | Color | ΔE* 24 hr soak | Avg. ΔE* |
|---|---|---|---|---|---|---|
| 5 | A | Epson 850 | Photo Qual IJ Paper/ 720 dpi | K | 2.41 | |
| | | | | W | 0.66 | |
| | | | | B | 5.44 | |
| | | | | C | 4.79 | |
| | | | | G | 3.48 | |
| | | | | Y | 3.92 | |
| | | | | R | 1.25 | |
| | | | | M | 1.81 | 2.97 |
| 6 | C | Epson 850 | Photo Qual IJ Paper/ 720 dpi | K | 3.17 | |
| | | | | W | 0.84 | |
| | | | | B | 18.42 | |
| | | | | C | 4.03 | |
| | | | | G | 11.15 | |
| | | | | Y | 4.18 | |
| | | | | R | 18.58 | |
| | | | | M | 7.87 | 8.53 |

From the data it can be seen that use of a coating including both a cationically charged clay and cationically charged silica (Coating A) enhances waterfastness of an ink jet printed image on a coated substrate, as measured by a spectrodensitometer. For instance, in observing data from the Epson 850 printer, the red ΔE* values for the control (Coating C) compared with the cationic clay/silica combination (Coating A) demonstrates a significant difference in light fastness.

While the invention has been described in detail with particular reference to a preferred embodiment thereof, it should be understood that many modifications, additions, and deletions can be made thereto without departure from the spirit and the scope of the invention as set forth in the following claims.

What is claimed is:

1. A coated substrate comprising a substrate and a coating comprising a cationically modified silica; a cationically modified clay; and a binder.

2. The coated substrate according to claim 1, wherein the cationically modified clay comprises an aqueous dispersion of Kaolin and a polyquaternary amine.

3. The coated substrate according to claim 1, wherein the cationically modified silica comprises an aqueous silica dispersion including a polyquaternary amine.

4. The coated substrate according to claim 1, wherein the cationically modified silica comprises aqueous amorphous silica stabilized with alumina.

5. The coated substrate according to claim 1, wherein the binder comprises a film forming, water insoluble polymer that is compatible with the cationic clay and the cationic silica.

6. The coated substrate according to claim 5, wherein the binder is selected from the group consisting of nonionic latexes comprising polymers of vinyl acetate, ethylene vinyl acetate, acrylates, acrylate vinyl acetate; styrenics comprising styrene rubbers (SBR), styrene maleic anhydride (SMA), and styrene acrylonitrile (SAN); cationic latexes; mildly anionic latexes; and mixtures thereof.

7. The coated substrate according to claim 1, wherein the weight ratio of clay to silica is from about 25% to about 35%.

8. The coated substrate according to claim 1, wherein the weight ratio of total clay and silica to binder is from about 20% to about 80%.

9. The coated substrate according to claim 8, wherein the weight ratio of total clay and silica to binder is from about 65% to about 75%.

10. The coated substrate according to claim 1, wherein the coating comprises one or more materials selected from the group consisting of UV absorbers/light stabilizers, surfactants, wetting agents, leveling agent, flow modifiers, optical whiteners, and brighteners.

11. The coated substrate according to claim 10, wherein the coating comprises a surfactant that is selected from the group consisting of nonionic, cationic, and zwitterionic surfactants.

12. The coated substrate according to claim 10, wherein the coating comprises a leveling agent, wherein the leveling agent comprises aliphatic diol.

13. The coated substrate according to claim 1, wherein the weight ratio of clay to silica is from about 1% to about 99%.

14. The coated substrate according to claim 1, wherein the weight ratio of clay to silica is from about 10% to about 50%.

15. The coated substrate according to claim 1, wherein the cationically modified clay comprises an aqueous dispersion of Kaolin and a polyquaternary amine and the cationically modified silica comprises an aqueous silica dispersion including a polyquaternary amine.

16. The coated substrate according to claim 1, wherein the cationically modified clay comprises an aqueous dispersion of Kaolin and a polyquaternary amine and the cationically modified silica comprises aqueous amorphous silica stabilized with alumina.

\* \* \* \* \*